(No Model.)
C. M. GREEN.
SYSTEM FOR GENERATING AND DISTRIBUTING ELECTRICAL ENERGY.
No. 573,647. Patented Dec. 22, 1896.
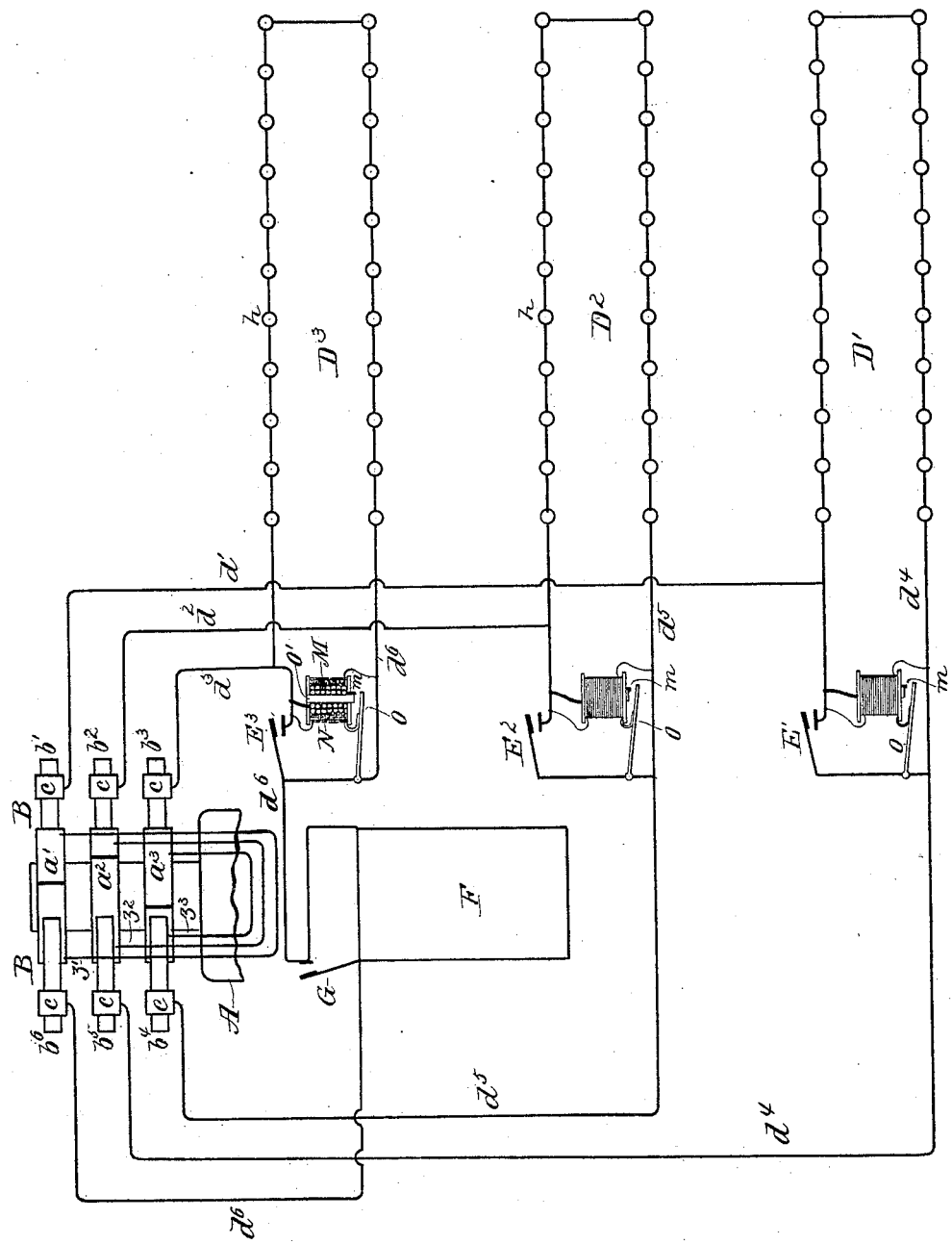
Witnesses
E. J. Nottingham
G. F. Downing
Inventor
C. M. Green
By H. A. Seymour
Attorney

UNITED STATES PATENT OFFICE.

CHARLES MAXWELL GREEN, OF CLEVELAND, OHIO, ASSIGNOR TO THE GENERAL ELECTRIC COMPANY, OF NEW YORK.

SYSTEM FOR GENERATING AND DISTRIBUTING ELECTRICAL ENERGY.

SPECIFICATION forming part of Letters Patent No. 573,647, dated December 22, 1896.

Application filed May 23, 1896. Serial No. 592,797. (No model.)

*To all whom it may concern:*

Be it known that I, CHARLES MAXWELL GREEN, of Cleveland, in the county of Cuyahoga and State of Ohio, have invented certain new and useful Improvements in Systems for Generating and Distributing Electric Energy; and I do hereby declare the following to be a full, clear, and exact description of the invention, such as will enable others skilled in the art to which it appertains to make and use the same.

My invention relates to a system for generating and distributing electric energy.

The object of the invention is to provide a system comprising a dynamo-electric machine capable of producing a high electromotive force, and in connection therewith of circuits so arranged that the difference of potential between any two points in the circuits or the machine may be reduced to and maintained at any desired amount below the total voltage which the machine is capable of producing, and automatic cut-outs so arranged as to automatically cut out any one of the several groups of electric lamps or translating devices included in the circuits of the machine, if from any cause the circuit of any one of such groups should become broken or open, whereby the remaining group or groups of electric lamps will be maintained in operation and unaffected by such open or broken circuit.

With this object in view my invention consists in a system for generating and distributing electric energy comprising a dynamo-electric machine provided with two or more separate sets or groups of armature coils or bobbins, separate working or load circuits connected between and included in series with the separate groups or sets of armature coils or bobbins, and automatic cut-outs for automatically cutting out and short-curcuiting any one of said working or load circuits should it become broken or open-circuited, and thereby maintaining intact the circuits including the remaining groups of translating devices.

The accompanying drawing is a diagrammatic representation of one embodiment of my invention.

A represents one end of an armature which may be an open or a closed coil armature.

$a'$, $a^2$, and $a^3$ represent three commutator-rings, and $z'$, $z^2$, and $z^3$ are three circuits, in each of which is included such a number of armature-coils of an open-coil armature or such a proportion of the armature-conductor of a close-coiled armature as will suffice to generate at any desired speed an electromotive force of, say, two thousand volts, and hence the total electromotive force of which the machine will be capable of generating will be six thousand volts or more. In the event an open-coil armature is employed the group of coils or bobbins included in any one of the circuits $z'$, $z^2$, and $z^3$ will be separate and distinct from the group of coils or bobbins included in any other of said circuits, whereby each group of coils or bobbins will be independent of every other group. In the event a close-coiled armature is employed the armature-winding will be subdivided into as many separate and independent windings as there are commutator-rings, so that each one of such separate windings shall operate independently of the others in generating electromotive force sufficient in amount to energize the maximum number of translating devices that may be included in the circuit connected therewith.

B represents the brushes, of which it may be assumed that $b'$, $b^2$, and $b^3$ are the positive and $b^4$, $b^5$, and $b^6$ the negative brushes, while $c$ represents the brush-holders.

The commutator-brush holders are mounted in a suitable yoke which is connected with an automatic regulator which serves to shift the brushes and automatically vary and regulate the total output of electromotive force generated by the machine to correspond to the total work or resistance that may be included in the external or working circuits at any given time. I have not deemed it necessary to illustrate or describe in detail the construction or mode of operation of the automatic regulator, because such devices are well known. Any suitable regulator may be employed in connection with a dynamo and circuits embodying my invention.

$D'$ $D^2$ $D^3$ are the external or working circuits, in which are included any suitable translating devices, and for the sake of illustration it may be assumed that in each circuit there are included forty arc-lamps of fifty volts each, so that the load of each external circuit nearly balances the electromotive force generated in each one of the groups of armature coils or bobbins included in the circuits $z'$, $z^2$, and $z^3$. The above conditions are desirable in practice, but they are not essential, since any one or more of the circuits may be cut out or any number of the lamps in either one of the circuits may be cut out, in which case the automatic regulator will operate to cut down the total output of electromotive force generated by the several groups of armature-coils to correspond to the resistance of and operate the remaining lamps in circuit.

It is of course understood that the figures above given are for the purpose of illustration merely, although, in fact, they closely approximate the conditions that exist in actual practice, and that in practice the machine will have a capacity for generating an amount of electromotive force somewhat in excess of the amount expended in operating the lamps or other translating devices in the external circuits.

$d'$, $d^2$, and $d^3$ are the circuit-wires of the positive side and $d^4$, $d^5$, and $d^6$ those of the negative side of the external circuits.

$E'$, $E^2$, and $E^3$ represent switches or cut-outs for cutting out the external or working circuits whenever desired.

F represents the field-coils of the machine, and G a cut-out switch across the terminals thereof.

The arrangement of switches and circuit-wires as shown is diagrammatic merely, and it is to be understood that I do not confine myself to the particular arrangement of parts shown and described.

With the circuit connections as shown and all the cut-outs or switches open the electromotive force generated in the group or set of armature coils or bobbins included in circuit $z'$ and connected to commutator-ring $a'$ passes through circuit $D'$ and translating devices included therein and back to the negative side of the commutator-ring $a^2$. The difference of potential between any of the brushes of the commutator-rings $a'$ and $a^2$ will not measure but slightly more than two thousand volts, while between $b'$ and $b^2$ it will be zero or substantially zero. The electromotive force generated in the group of armature coils or bobbins included in the circuit $z^2$ and connected to commutator-ring $a^2$ will pass through circuit $d^2$, the external or working circuit $D^2$ and translating devices included therein, and by circuit $d^5$ and brush $b^5$ to the commutator-ring $a^3$. The difference of potential between the commutator-brushes of the rings $a^2$ and $a^3$ will nowhere measure but slightly more than two thousand volts. The electromotive force generated in the group of armature coils or bobbins included in the circuit $z^3$ and connected to commutator-ring $a^3$ will pass by commutator-brush $b^3$ through circuit $D^3$ and translating devices included therein and then through the field-coils F of the machine to brush $b^6$ and to commutator-ring $a'$. The difference of potential between the commutator-brushes of the rings $a^3$ and $a'$ will measure but slightly more than two thousand volts. It will thus be found that the difference of potential between any two points on the machine or in the external circuits will but slightly exceed two thousand volts, notwithstanding that the machine is capable of generating a total electromotive force of six thousand volts or more.

By means of the system thus far described it is evident that a single machine may be constructed to operate a large number of lamps arranged in separate groups on separate circuits. However, in view of the fact that while such groups of lamps are included in separate circuits such circuits and groups of bobbins are all connected in series, so that in the event any one of such circuits should become broken or open-circuited from any cause it would result in rendering inoperative every lamp connected with and operated by the machine, and in a system wherein, say, five hundred lamps are all operated by a single machine the result of open-circuiting any one of the several working circuits might be and doubtless would be attended with serious consequences. To obviate the trouble and disastrous results which would attend the open-circuiting of any one of the separate working circuits, I provide each one of such circuits with an automatic cut-out, whereby in the event that any one of the several circuits should be broken or open-circuited the cut-out connected therewith would operate to instantly short-circuit such defective or broken circuit and maintain in uninterrupted operation the lamps or other translating devices included in all of the other working circuits. One form of automatic cut-out which will answer the desired purpose is represented in the drawings as being associated and connnected with each one of the working circuits. This cut-out consists of an electromagnet provided with a coarse-wire helix M and a fine-wire helix N. The opposite ends of the fine-wire helix are connected across the positive and negative ends of the working circuit, and constitute a high-resistance shunt to the circuit and translating devices included therein. The high-resistance circuit, including the helix N, is constantly closed, so that current is constantly flowing therein, but owing to the high resistance only a small amount will flow through it under normal conditions of operation. One end of the low-resistance helix is electrically connected with the positive end of the working circuit, while its opposite end $m$ constitutes a stop and contact with which the armature O engages when sufficiently attracted by the core $O'$ of the electromagnet. The armature is electrically connected at its pivoted end with the negative side or end of the working circuit.

Under normal conditions the current flowing through the fine-wire helix N will not be sufficient in amount to attract and raise the armature O; but in the event the circuit should be broken or open-circuited from any cause then such an additional amount of current will be forced to flow through the fine-wire helix N as will cause it to attract and raise the armature O, which on making contact with the end $m$ of the low-resistance helix M will form a shunt-circuit of low resistance around the working circuit and lamps included therein, and will thereby serve to insure the uninterrupted operation of all the remaining lamps or translating devices which are included in the other working circuits connected with the machine.

In the event the working circuit D' should be broken or open-circuited the cut-out connected across its terminals would automatically establish a low-resistance short circuit around such working circuit, and thereby maintain the lamps in circuits $D^2$ and $D^3$ in uninterrupted operation. This is also true of the other working circuits, either of which, should it become broken or open-circuited, will be automatically shunted out of operation and will be maintained out of operation until the circuit has been repaired or restored.

Other constructions of cut-outs may be better suited and adapted for the purpose in view than the particular construction shown and described, and hence I would have it understood that I in no wise restrict myself to the employment of any particular type or construction of automatic cut-out.

I make no claim in this patent to the improved multicircuit connection for dynamo-electric machines herein shown and described and which consists in two or more lighting-circuits connected between and included in series with separate groups of armature coils or bobbins of a dynamo-electric machine, as such subject-matter of invention is disclosed and is broadly and specifically claimed in my prior pending application, Serial No. 588,108, and is reserved to be protected by the patent granted thereon. The invention disclosed and claimed in this patent is a distinct improvement on the multicircuit connection of my prior application referred to, and consists in the combination, with the several lighting-circuits connected with a dynamo, of automatic cut-outs so constructed and arranged as to automatically switch out of operation any one of the lighting or working circuits.

Having fully described my invention, what I claim as new, and desire to secure by Letters Patent, is—

1. The combination with a dynamo-electric machine having two or more separate groups or sets of armature coils or bobbins, of two or more separate working circuits, each of which is electrically connected with the positive end of one group of armature-coils and with the negative end of another group of armature-coils, and automatic cut-outs for automatically switching out of operation any one of the working circuits if broken or open-circuited, substantially as set forth.

2. The combination with a dynamo provided with two or more separate sets or groups of armature coils or bobbins, and a commutator for each set or group, of two or more working circuits each having translating devices included therein, said working circuits each being connected between and included in series with the separate groups of armature coils or bobbins, and automatic cut-outs arranged and adapted to provide a shunt-circuit of low resistance around each one of said working circuits, substantially as set forth.

In testimony whereof I have signed this specification in the presence of two subscribing witnesses.

CHARLES MAXWELL GREEN.

Witnesses:
G. G. NOTTINGHAM,
J. FRED. KELLEY.